Aug. 25, 1970  R. A. STEVENSON  3,525,964

ZERO-PHASE-SEQUENCE TRANSFORMER

Original Filed June 1, 1967

United States Patent Office 3,525,964
Patented Aug. 25, 1970

3,525,964
ZERO-PHASE-SEQUENCE TRANSFORMER
Robert A. Stevenson, Toronto, Ontario, Canada, assignor to Federal Pacific Electric Company, a corporation of Delaware
Continuation of application Ser. No. 642,909, June 1, 1967. This application Aug. 15, 1968, Ser. No. 755,021
Int. Cl. H01f 15/04
U.S. Cl. 336—84                    12 Claims

ABSTRACT OF THE DISCLOSURE

A zero-phase sequence transformer has the conductors to a load extending through a running magnetic core on which there is a zero-phase-sequence-current output winding. Magnetic shielding is included for minimum spurious output. The magnetic shielding includes a shielding core that covers the portion of the output winding which faces the load conductors, and the magnetic shielding also includes lateral portions extending across the sides of the running core and the output winding.

---

This is a continuation of my application Ser. No. 642,909 filed June 1, 1967 and copending herewith, now abandoned.

The present invention relates to current transformers such as are used with heavy current carrying conductors especially bus bars, and in particular to zero-phase-sequence transformers.

A type of current transformer has been used for many years to detect so-called ground leakage or ground fault currents in single phase and polyphase circuits. The current transformer comprises a closed-loop core that encircles the power conductors and has a current carrying winding about the core. Current from the source travels to the load through the conductors extending through the transformer, under normal conditions. In case abnormal conditions should develop, such as ground leakage current or ground fault current by-passing the core, the winding on the core will provide output to indicate the abnormal condition.

It has commonly been assumed that all of the flux associated with the heavy current carrying conductors threads through the core of these transformers. This is a satisfactory assumption in the case of cores that are circular or toroidal and of relatively large cross section, in proportion to the size of the window opening. Such current transfomers are used with wire or cable through a circular opening formed by the core and this form of current transformer usually operates satisfactorily. Where heavy-current conductors are involved and where their size is such that a core of relatively large cross section would be impractical, the reluctance around the core loop is appreciable and the theoretical performance is not realized. Each conductor apparently tends to impose its own saturation effects locally on portions of the core loop. As a result, and particularly where there may be greatly unbalanced currents in the several high-current conductors (but without ground leakage or ground fault current) spurious output appears at the output winding of the transformer.

While this effect has been recognized in the past there has not been any satisfactory solution to the problem of assuring proper performance for indicating ground leakage current or ground fault current separate and apart from spurious effects that may result from normal loads including unbalanced loads in the heavy-current conductors through the window of the transformer. The problem is particularly acute where heavy bus bars are used as the load carrying conductors and where the bus bars are arranged in a rectangular pattern, and where the cross-section of the bus bar assembly is a rectangular pattern. By like token, where the load carrying conductors are cables emerging from the side-by-side terminals of a multipole switch or circuit breaker, as is particularly common in three phase switches, circuit breakers and the like, the same problem exists. In any practical construction, there will be a rectangular-window core in zero-phase-sequence transformers for such rectangular patterns of heavy-current conductors. The core must be of modest cross section for reasons of weight, size and expense. Because of these practical limitations, rectangular zero-phase-sequence transformers have been unsuccessful so far as I am aware. Instead, it has been customary to use multiple toroidal-cored current transformers individual to each phase and to connect such current transformers together in a manner to provide an indication of ground leakage or ground fault current.

An object of the present invention resides in providing novel zero-phase-sequence transformers of a form that largely if not entirely eliminates the problem of spurious output from such transformers, and in particular an object of this invention resides in the provision of novel zero-phase-sequence transformers of practical proportions and having rectangular-looped cores appropriate to use with heavy-current conductors that have a rectangular pattern as viewed in transverse cross-section.

The foregoing objects and others are achieved in accordance with the illustrative embodiment of the invention described in detail below and shown in the accompanying drawings which form a part of the disclosure of the invention. In that illustrative embodiment there is a closed-loop magnetic core having a window through which the heavy-current conductors are to extend. As a convenient term of reference this is called the "running" core; and the term "closed-loop" is used to refer to cores not having an air gap. The illustrative embodiment additionally includes a closed-loop magnetic core disposed inside the window of the running core and having its own window through which the high-current conductors are to extend; and an additional pair of lateral cores are disposed at opposite sides of the closed-loop cores. Each extends across both of those closed loop cores. In its most important form, the entire core structure is rectangular and has a rectangular window. The window accommodates various configurations of bus bar assemblies that have a rectangular pattern. Likewise the rectangular window accommodates three or more side-by-side heavy current carrying conductors extending to the line or load terminals of a circuit breaker, switch or the like, whether these high current conductors be cables or bus bars.

The illustrative embodiment involves a particular distribution of the conductive winding on the running core that is of special advantage when the transformer is used with three side-by-side heavy-current conductors, whose spacing is that of the terminals of three-pole switches, circuit breakers and the like. The illustrative embodiment involves a further feature of particular significance in the case of three phase three wire systems where the high-current conductors are arranged side by side. The electrical output winding on the "running" core is divided into what may be called concentrated winding sections. These are located on the core opposite the spaces between each adjacent pair of high-current conductors. Thus there are two sections of the electrical output winding on the part of the core extending above and across the high-current conductors, one of these two sections being opposite the space between the first and second of the high-current conductors and the second of these two sections being opposite the space between the second and third of the high-current conductors. Correspondingly there are two sections of the electrical output winding on the part of the core extending below and across the high-current conductors, disposed respectively opposite the space between the first and second high-current conductors and opposite the space between the second and third high-current conductors. The four sections of the current carrying winding are connected series-aiding. This distribution of the electrical output winding on the running core contributes to the optimum performance of the rectangular zero-phase-sequence transformer in this particular application, and it also performs effectively when the transformer is used with paired-phase bus duct and with sequence-phase bus duct with side-by-side bus bars including plural parallel-connected bus bars per phase.

The illustrative embodiment is shown in the accompanying drawings wherein.

Figure 1:
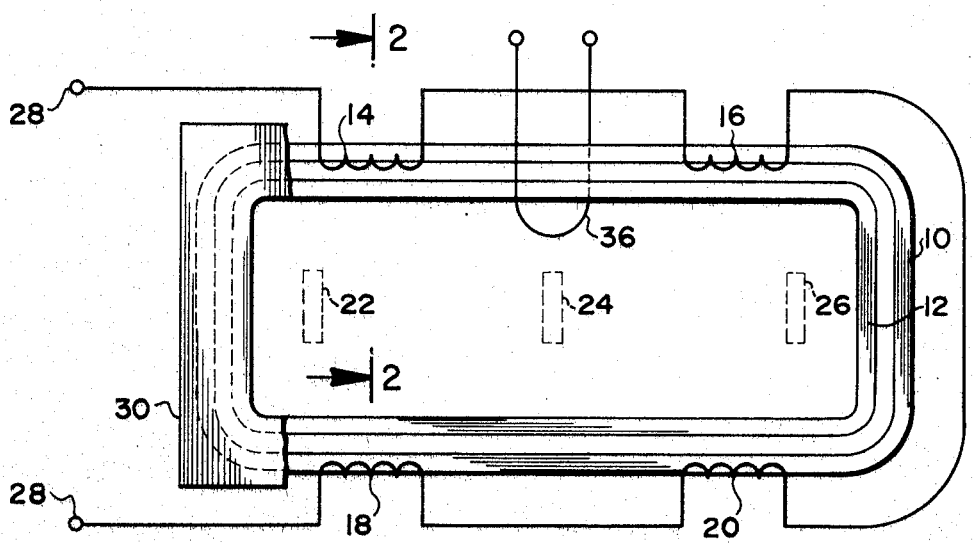
FIG. 1 is a front elevation with part of the core structure broken away and with the windings illustrated diagrammatically.
Figure 2:
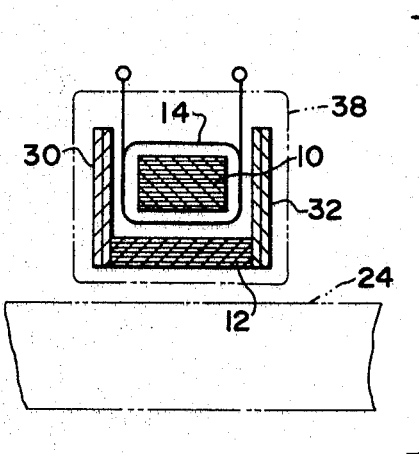
FIG. 2 is an enlarged cross section of the core structure in the embodiment of FIG. 1 as viewed from the plane 2—2 of FIG. 1.

In both FIGS. 1 and 2 the high-current conductors about which the zero-phase-sequence transformer is to be used are shown in dotted lines. These are typical of the distribution of conductors at the terminals of three-pole switches and circuit breakers.

Figure 3:
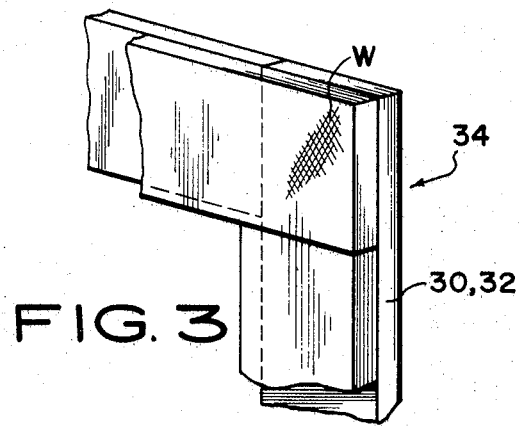
FIG. 3 is a corner detail of part of the illustrative core structure in the embodiment of FIGS. 1 and 2.

In the drawings magnetic cores 10 and 12 are formed of high permeability material commonly used for current transformers, made of continuously wound strip material and in the form of a rectangle as shown. Core 10 is the "running" core and has four sections 14, 16, 18 and 20 of the conductive winding thereon. These sections of the output winding are connected series-aiding to provide electrical output at terminals 28. Core 10 has a rectangular window in which core 12 is disposed; and core 12 in turn, has a rectangular window through which the high current conductors 22, 24 and 26 are to extend between a source and a load. Third and fourth portions 30 and 32 of the core assembly are disposed at opposite sides of the wound closed-loop cores 10 and 12. In the form shown, cores 30 and 32 are of strips of high permeability magnetic stock that are assembled to provide a corner structure 34 as shown in FIG. 3 that are overlapped as shown in FIG. 3 and are joined by a spot weld W. Cores 30 and 32 have no magnetic gap and are also closed-loop cores about the conductors 22, 24 and 26. Cores 12, 30 and 32 extend only incompletely around coil 14 as viewed in the plane of FIG. 2. Planes such as this, which cut across the magnetic flux path, may be called imaginary planes perpendicular to the running magnetic core.

In an example, the horizontal extent of the window in core 12 is 18″. Each winding section occupies a distance of 4½″ and has 250 turns of wire, arranged as a single layer. The cross section of core 10 is 1″ wide by ⅝″ deep, and the cross section of core 12 is 1¼″ wide by ³⁄₁₆″ deep, while each of the lateral shielding cores 30 and 32 is formed of two ¹⁄₁₆″ thick strips 1¼″ wide. A calibrating coil 36 which may be a single turn or multiple turns extends through the window in all the cores. The entire device is encapsulated in insulation 38 which is represented by broken lines to insure a clear showing of the active structure of the transformer.

In the absence of cores 12, 30 and 32, the particular distribution of coil sections 14, 16, 18 and 20 on core 10 was found to have significant advantage toward reducing the amount of spurious output at terminals 28 under conditions of zero ground leakage, when those coil sections were centered opposite the spaces between adjacent conductors 22–24 and between adjacent conductors 24–26. With these windings and with other winding distributions, and with the addition of core 12, a substantial amount of spurious output was obtained at terminals 28 under conditions of no ground leakage. Likewise, with another core like core 12 of greatly increased extent along the load conductors (horizontally extended, in FIG. 2) there was no appreciable improvement. However, with the addition of the lateral core sections 30 and 32, a dramatic advance is achieved toward reducing to zero the spurious output at terminals 28 which tends otherwise to appear under various conditions of three-phase current distribution in heavy-current conductors 22, 24 and 26.

For calibration of the transformer output appearing at leads 28, a test coil 36 is included in the transformer. Known values of current are passed through coil 36 to represent ground leakage current in a system that includes conductors such as bars 22, 24 and 26 and a by-pass or leakage path not extending through the window. An indicating instrument connected to terminals 28 will then give direct readings of ground leakage current.

The current transformer shown and described is useful to indicate ground leakage with other heavy-current conductors than those in FIG. 1, as for example around the bars in a bus duct of paired-phase, sequence-phase and other configurations.

What I claim is:

1. A zero-phase-sequence current transformer comprising a closed-loop running magnetic core surrounding a window opening through which heavy-current conductors may extend, an electrical output winding on said running core, and magnetic shielding means for said output winding extending only incompletely around said output winding when viewed in an imaginary plane perpendicular to said running magnetic core, said magnetic shielding means including a shielding core covering the portion of said output winding facing said window opening and magnetic shielding extending transversely from said shielding core and laterally of said output winding.

2. A zero-phase-sequence current transformer in accordance with claim 1, wherein said magnetic shielding extends across at least one entire side of said output winding.

3. A zero-phase-sequence current transformer in accordance with claim 1, wherein said magnetic shielding extends across at least a substantial part of both sides of said output winding.

4. A zero-phase-sequence current transformer in accordance with claim 1, wherein said magnetic shielding extends across both entire sides of said output winding.

5. A zero-phase-sequence current transformer in accordance with claim 1, wherein both said shielding core and said magnetic shielding surround the window opening.

6. A zero-phase-sequence current transformer in accordance with claim 1, wherein both said shielding core and said magnetic shielding surround the window opening and wherein said magnetic shielding extends substantially across each side of said output winding.

7. A zero-phase-sequence current transformer in accordance with claim 1, wherein both said shielding core and said magnetic shielding surround the window opening, said transformer being intended for use with a series of side-by-side heavy-current conductors, and said cores and said magnetic shielding being rectangular and providing a rectangular window opening.

8. A zero-phase-sequence current transformer in accordance with claim 7 for use with three side-by-side heavy-current conductors wherein said electrical output winding is divided into four series-aiding sections disposed on said running core in pairs opposite the spaces between the intended locations of the three heavy-current conductors.

9. A zero-phase-sequence current transformer in accordance with claim 1, wherein said window opening contains high-current conductors constituting the power conductors from an alternating-current source to a load for providing a representation of the zero-phase-sequence current in the output winding.

10. A zero-phase-sequence transformer in accordance with claim 9, wherein both said shielding core and said magnetic shielding surround the window opening.

11. A zero-phase-sequence transformer in accordance with claim 9, wherein respective portions of said magnetic shielding extend across both sides of said running core.

12. A zero-phase-sequence transformer in accordance with claim 9, wherein both said shielding core and said magnetic shielding surround the window opening and wherein respective portions of said magnetic shielding extend across both sides of said running core.

References Cited

UNITED STATES PATENTS

| | | | |
|---|---|---|---|
| 433,702 | 8/1890 | Tesla | 336—84 XR |
| 1,832,662 | 11/1931 | Schmutz | 336—175 XR |
| 1,857,215 | 5/1932 | Ruder | 336—175 XR |
| 2,267,955 | 12/1941 | Squibb | 336—212 XR |
| 2,618,689 | 11/1952 | Cook | 336—174 XR |

FOREIGN PATENTS 1,469,119  1/1967  France.

OTHER REFERENCES

Lane et al. German App. No. 1,086,341, publ. Aug. 4, 1960, Class 336—174.

THOMAS J. KOZMA, Primary Examiner

U.S. Cl. X.R.
336—175, 184, 212